United States Patent
Dong et al.

(10) Patent No.: US 10,628,890 B2
(45) Date of Patent: Apr. 21, 2020

(54) VISUAL ANALYTICS BASED VEHICLE INSURANCE ANTI-FRAUD DETECTION

(71) Applicant: International Business Machines Corporation, Armonk, NY (US)

(72) Inventors: Wei Shan Dong, Beijing (CN); Peng Gao, Beijing (CN); Chang Sheng Li, Beijing (CN); Wen Han Luo, Beijing (CN); Ren Jie Yao, Beijing (CN); Ting Yuan, Beijing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 15/440,251

(22) Filed: Feb. 23, 2017

(65) Prior Publication Data
US 2018/0240194 A1    Aug. 23, 2018

(51) Int. Cl.
*G06Q 40/08* (2012.01)
*G06Q 30/00* (2012.01)

(52) U.S. Cl.
CPC ......... *G06Q 40/08* (2013.01); *G06Q 30/0185* (2013.01)

(58) Field of Classification Search
USPC .......................................................... 705/4
See application file for complete search history.

(56) References Cited

U.S. PATENT DOCUMENTS

| 6,397,334 | B1 | 5/2002 | Chainer et al. |
| 6,463,432 | B1 * | 10/2002 | Murakawa .......... G06F 16/5838 |
| 6,618,501 | B1 * | 9/2003 | Osawa ..................... G06K 9/48 |
| | | | 382/165 |

(Continued)

FOREIGN PATENT DOCUMENTS

| CN | 103810637 | | 5/2014 |
| JP | 2006277166 A | * | 10/2006 |
| JP | 4693454 B2 | * | 6/2011 |

OTHER PUBLICATIONS

Content Based Retrieval of VRML Objects—An Iterative and Interactive Approach Elad, Tal, Ar Eurographics Multimedia 2001.*

(Continued)

*Primary Examiner* — William E Rankins
(74) *Attorney, Agent, or Firm* — Fleit Intellectual Property Law; Jose Gutman

(57) ABSTRACT

A system, a computer readable storage medium, and a method for detecting insurance fraud or for comparing references use visual analytics-based techniques. The method can include identifying a scratch and a scratch location on a vehicle in a 3-dimensional rendering in comparison to a base image or in comparison to a stored image in a database, comparing one or more features of the scratch such as color features of the scratch in the scratch location in comparison to the scratch location or comparing one or more texture features of the scratch in the scratch location in comparison to the scratch location in the base image or the stored image. The method can further generate a similarity calculation based on the one or more comparisons for the scratch, the scratch location, the one or more scratch features of the scratch and presents a result in response to the similarity calculation.

20 Claims, 5 Drawing Sheets

(56) References Cited

U.S. PATENT DOCUMENTS

| | | | | |
|---|---|---|---|---|
| 8,239,220 B2* | 8/2012 | Kidd | | G01M 17/0078 |
| | | | | 705/305 |
| 8,320,671 B1* | 11/2012 | Zoghlami | | G06F 16/583 |
| | | | | 382/170 |
| 8,346,578 B1 | 1/2013 | Hopkins, III et al. | | |
| 9,604,563 B1* | 3/2017 | Wilson, II | | B60P 3/14 |
| 10,304,137 B1* | 5/2019 | Genser | | G06Q 40/08 |
| 2002/0168117 A1* | 11/2002 | Lee | | G06F 16/58 |
| | | | | 382/305 |
| 2007/0143272 A1* | 6/2007 | Kobayashi | | G06F 16/583 |
| 2007/0286531 A1* | 12/2007 | Fu | | G06K 9/46 |
| | | | | 382/305 |
| 2008/0021882 A1* | 1/2008 | Pu | | G06F 16/583 |
| 2008/0152225 A1* | 6/2008 | Iwamoto | | G06K 9/4642 |
| | | | | 382/190 |
| 2010/0094664 A1 | 4/2010 | Bush et al. | | |
| 2011/0176737 A1* | 7/2011 | Mass | | G06F 11/1471 |
| | | | | 382/220 |
| 2013/0195361 A1* | 8/2013 | Deng | | G06K 9/4671 |
| | | | | 382/195 |
| 2015/0103170 A1* | 4/2015 | Nelson | | G06Q 40/08 |
| | | | | 348/148 |
| 2015/0332407 A1* | 11/2015 | Wilson, II | | G06Q 40/08 |
| | | | | 705/4 |
| 2016/0110818 A1 | 4/2016 | Shemesh et al. | | |
| 2016/0189323 A1* | 6/2016 | Wakabayashi | | G08G 1/164 |
| | | | | 705/325 |
| 2016/0335727 A1* | 11/2016 | Jimenez | | G06Q 40/08 |
| 2017/0109949 A1* | 4/2017 | Blumer | | G07C 5/0866 |
| 2017/0148102 A1* | 5/2017 | Franke | | G06Q 10/20 |
| 2017/0293894 A1* | 10/2017 | Taliwal | | G06T 7/0004 |
| 2018/0040039 A1* | 2/2018 | Wells | | G06Q 30/0283 |
| 2018/0121710 A1* | 5/2018 | Leizerson | | G06K 9/00577 |
| 2018/0240194 A1* | 8/2018 | Dong | | G06Q 30/0185 |
| 2018/0260793 A1* | 9/2018 | Li | | G06Q 10/20 |
| 2018/0293806 A1* | 10/2018 | Zhang | | G07C 5/006 |

OTHER PUBLICATIONS

"Extended Gaussian Images" Horn, Dec. 1984, IEEE vol. 72, No. 12.*

Indexing and retrieval of 3D models aided by active learning Zhang, Chen Multimedia '01 Proceedings of the ninth ACM international conference on Multimedia pp. 615-616 Sep. 30-Oct. 5, 2001.*

Jayawardena, S., "Image based automatic vehicle damage detection", A thesis submitted for the degree of Doctor of Philosophy at the Australian National University, http://hdl.handle.net/1885/11072, Nov. 2013, pp. 1-199.

Pavel, C., "Methods for detection of insurance fraud in motor vehicles", Aug. 20, 2014, http://www.posterus.sk/?p=17323, pp. 1-7.

Girshick, R., et al., "Rich feature hierarchies for accurate object detection and semantic segmentation", Proceedings of the IEEE Conference on Computer Vision and Pattern Recognition, Jun. 23-28, 2014, pp. 1-8.

Fei-Fei, L., et al., "A Bayesian Hierarchical Model for Learning Natural Scene Categories", Proceedings of the IEEE Computer Society Conference on Computer Vision and Pattern Recognition, Jun. 20-25, 2005, pp. 1-8.

Girshick, R., "Fast R-CNN", Proceedings of the IEEE International Conference on Computer Vision, Dec. 7-13, 2013, pp. 1-9.

Ren, S., et al., "Faster R-CNN: Towards Real-Time Object Detection with Region Proposal Networks", Proceedings of Advances in Neural Information Processing Systems, Dec. 7-12, 2015, pp. 1-9.

Wikipedia, "Support vector machine", https://en.wikipedia.org/wiki/Support_vector_machine, last visited on Dec. 13, 2016, pp. 1-15.

Wikipedia, "Decision Tree", https://en.wikipedia.org/wiki/Decision_tree, last visited on Dec. 13, 2016, pp. 1-5.

* cited by examiner

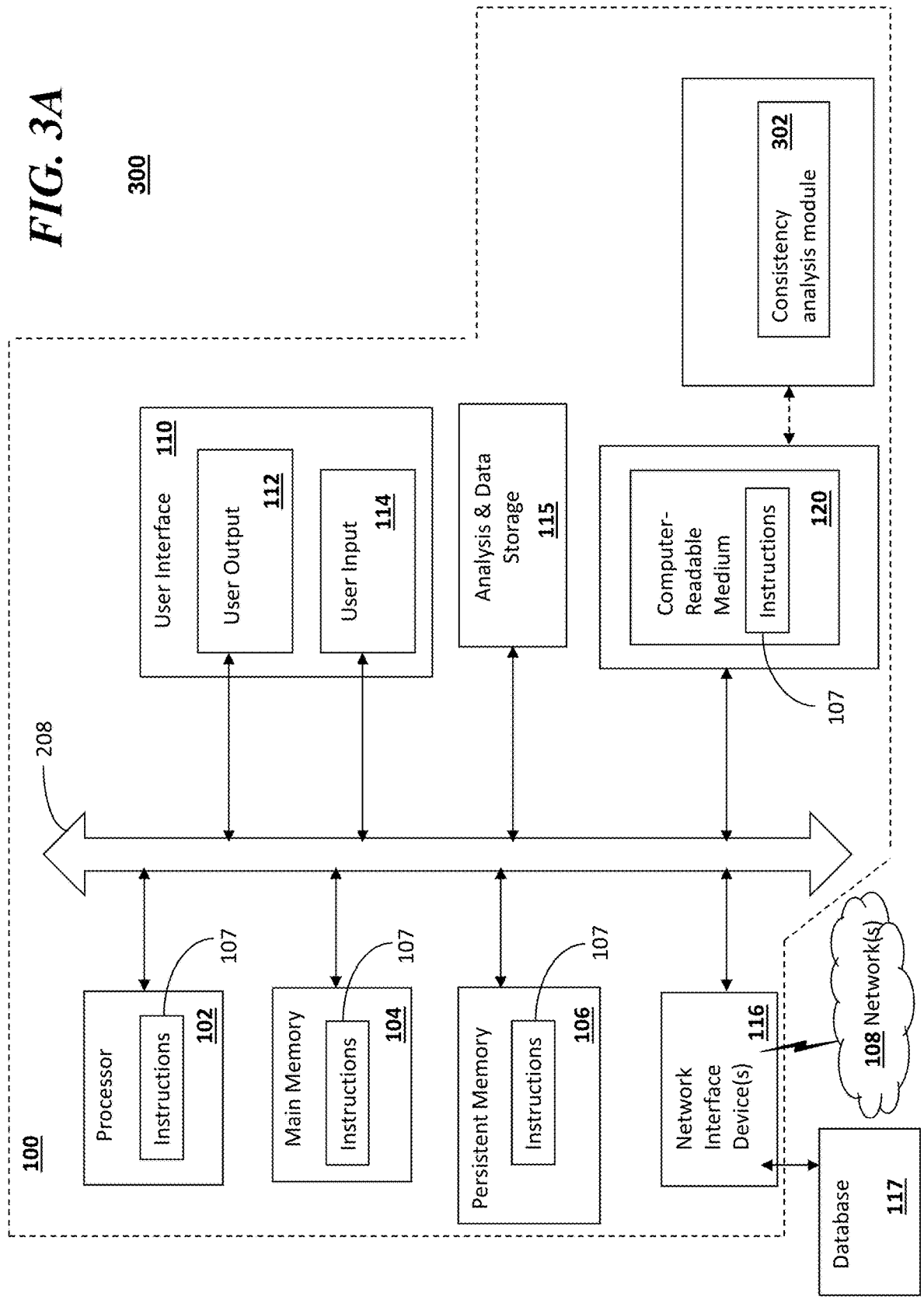

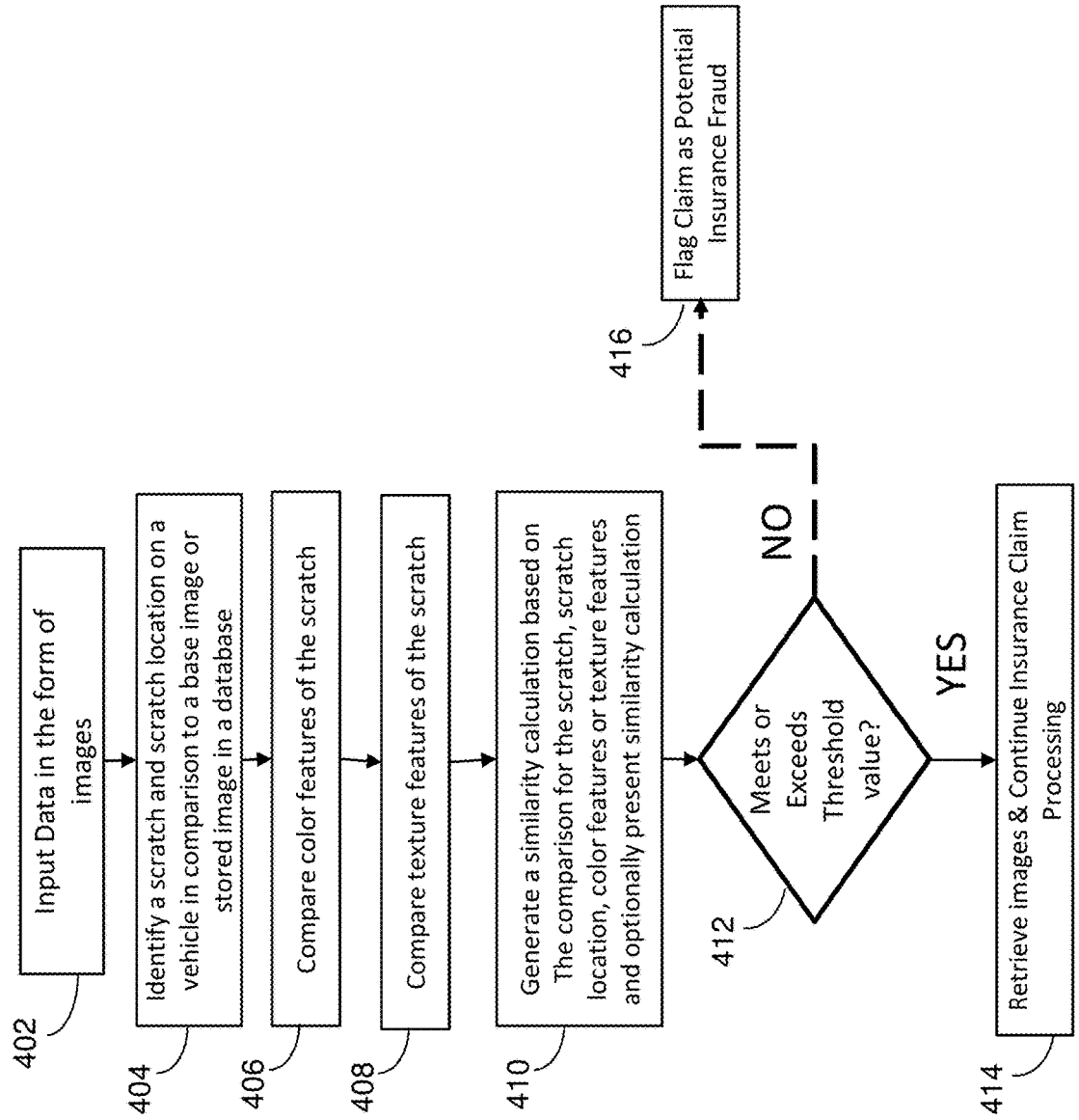

VISUAL ANALYTICS BASED VEHICLE INSURANCE ANTI-FRAUD DETECTION

BACKGROUND

The present disclosure generally relates to a computer system and method, and more particularly relates to a system and method for detecting insurance fraud or for comparing references using visual analytics-based techniques.

Computer systems are generally not ideally configured for detecting fraud in claims for vehicle insurance due to the many variables involved and the human labor involved. Damages caused by a vehicle and the types of claims are extremely diverse and inspection by humans can be costly, error prone, and time consuming for both the claimant and the inspecting party.

Due to the human component in making insurance claims and processing insurance claims, fraud in vehicle claims can increase premium costs by a significant factor.

SUMMARY

According to one embodiment of the present disclosure, a method for detecting insurance fraud or for comparing references using visual analytics-based techniques can include steps for identifying a scratch and a scratch location on a vehicle in a 3-dimensional rendering in comparison to a base image, comparing one or more color features of the scratch in the scratch location in comparison to the scratch location in the base image and comparing one or more texture features of the scratch in the scratch location in comparison to the scratch location in the base image. The method can further include generating a similarity calculation based on the one or more comparisons for the scratch, the scratch location, the one or more color features of the scratch, or the one or more texture features of the scratch and presenting a result in response to the similarity calculation.

According to another embodiment of the present disclosure, a system for detecting insurance fraud or for comparing references using visual analytics-based techniques can include at least one memory and at least one processor of a computer system or computing device communicatively coupled to the at least one memory. The one or more processors can be responsive to instructions stored in the memory and can be configured to the operations of identifying a scratch and a scratch location on a vehicle in a 3-dimensional rendering in comparison to a base image, comparing one or more color features of the scratch in the scratch location in comparison to the scratch location in the base image, comparing one or more texture features of the scratch in the scratch location in comparison to the scratch location in the base image, and generating a similarity calculation based on the one or more comparisons for the scratch, the scratch location, the one or more color features of the scratch, or the one or more texture features of the scratch.

According to yet another embodiment of the present disclosure, a non-transitory computer readable storage medium comprises computer instructions which, responsive to being executed by one or more processors, cause the processor or processors to perform operations as described in the methods or systems above or elsewhere herein.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3A is a block diagram of an information processing system according to various embodiments of the present disclosure;

FIG. 4 is a flow diagram illustrating a method according to various embodiments of the present disclosure.

DETAILED DESCRIPTION

As required, detailed embodiments of the present disclosure are disclosed herein; however, it is to be understood that the disclosed embodiments are merely examples of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure and function. Further, the terms and phrases used herein are not intended to be limiting; but rather, to provide an understandable description of the disclosure.

According to various embodiments of the present disclosure, disclosed is a system and method for gathering information and identifying potentially fraudulent insurance claims in an insurance claims process, particularly for automotive or vehicle insurance. The systems, methods and models disclosed herein enable an insurance company to identify potentially fraudulent claims very early in the claims process to avoid wasted time and unnecessary claim payouts. Manual examination of claims can be very time consuming and costly from a labor standpoint and some of the unique verification techniques incorporated herein enables a more efficient and effective system and process. This process is also effective for claims that are fast-tracked and that might not otherwise be flagged for fraud.

Figure 1:
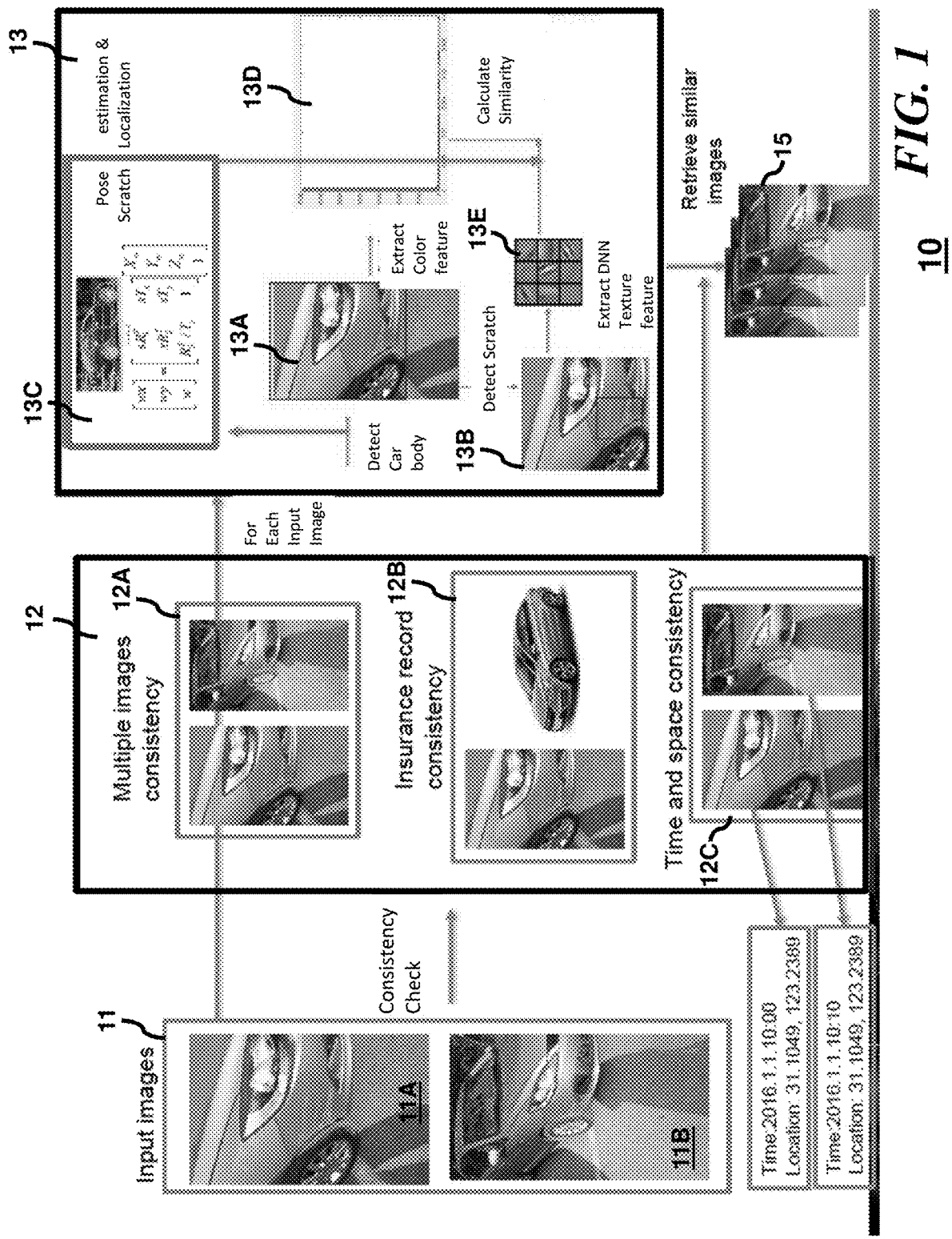
FIG. 1 is a depiction of flow diagram of a system or method for detecting insurance fraud or for comparing references using visual analytics-based techniques according to various embodiments of the present disclosure.

Existing input data obtained from claimants or other sources can have consistency problems that cannot be easily verified by a human examiner or can have inconsistencies overlooked by such human examiners or even by existing computerized analysis techniques. In particular, multiple images used for a claim can be manipulated or presented or rather misrepresented as being for the same claim when they may not necessarily be for the same claim. A system or method 10 represented in FIG. 1 includes an initial step where input images 11A and 11B are provided at block 11 for purposes of initiating a consistency check. Such a check or analysis of images can delve into a number of factors to determine a degree or level of consistency. In the case of a vehicle insurance claim, a comparison of the images can be made to determine if the same vehicle is being reviewed. For example, the images of a car can be reviewed for model, make, color and if additional data is available from the image other data points can be checked such as vehicle identification numbers or VINs (that might be found in the image that might be etched on glass or etched, stamped or embossed on other portions of the vehicle). Thus, at block 12, a consistency check can include a consistency check of the images for data points such as make and model and even color at block 12A, an insurance record consistency check at block 12B, and a time and space consistency check of the images at block 12C. Presuming that the images include metadata such as time stamps and GPS coordinates or geographic indicators, such data points can be checked for consistency. If the time stamps and GPS coordinates of the images closely match, then it is less likely that such images are being used to perpetrate a fraud. Even without such metadata, information can be extracted and compared from the images by comparing backgrounds or environmental features such as illumination or shadow features. An additional level of consistency analysis can occur at block 13. More particularly, block 13 can include one or more consistency checks that can extract information from an image 13A and analyze and compare a scratch at block 13B or for a scratch location within the context of a particular car model at block 13C, or scratch features such as scratch colors at block 13D or extract and compare a scratch texture feature at block 13D. After the consistency check and analysis done at blocks 12 and 13, the system and method can retrieve similar images at block 15 with some level of assurance that the images are for the same vehicle for the same damage claim. Note that the images input into the system 10 can be two newly introduced images to be compared or a new image compared to an image that is previously stored at a database for the insurance company.

Examples of the analysis or comparison used in various embodiments can take many forms, performed in different orderings, and performed in many different combinations. Such analysis or comparison of the various components to be considered can be correlated, cross-correlated, and weighted in any number of combinations and permutations to determine a similarity or consistency rating between images.

Figure 2:
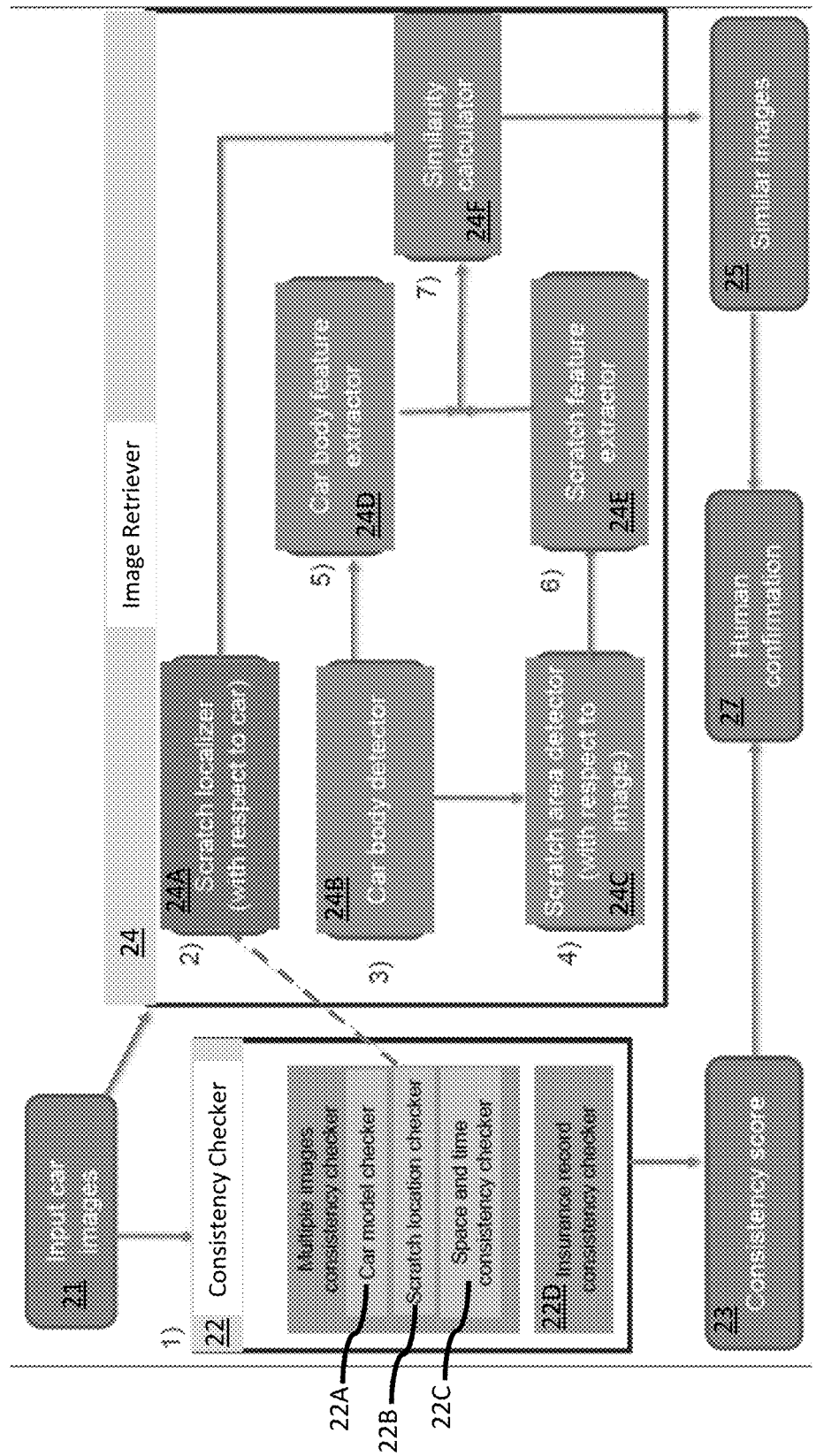
FIG. 2 is another depiction of flow diagram of a system or method for detecting insurance fraud or for comparing references using visual analytics-based techniques according to various embodiments of the present disclosure.

Referring to another system or method 20 in FIG. 2, the method can include inputting images at block 21 and running a consistency check at block 22 for the input images from block 21 while additional images are retrieved for comparison at block 24. The consistency check at block 22 can include a car model checker at block 22A to confirm or at least provide a higher confidence level that the images match in terms of car model, a scratch location checker to confirm at block 22B to confirm or at least provide a higher confidence level that the scratch shown in each image is consistent with the location of the scratch within the context of the car body for each image, and a space and time consistency checker at block 22C to confirm or at least provide a higher confidence level that the images are for the same vehicle and for the same scratches or other damage. The consistency checker 22 can also include an insurance record consistency checker 22D that provides a higher confidence level that the vehicle and scratches are not inconsistent with information provided in the insurance records. The output of the consistency checker can provide a consistency score at block 23. The image retriever 24 can also include several checkers 24A-24E that can provide further assurance or verification that images are not part of a fraudulent claim. Checker 24A localizes a scratch with respect to a location on a particular car body and compares the scratch location with a location (with respect to the car body) on the retrieved image for consistency. If the scratch appears in different locations, then it must be for different cases or claims and flagged for potential fraud. The checker 24A can accelerate retrieval and provide better accuracy. In some embodiments, the risks brought by the car's symmetry property can be easily considered in the assessment by flipping left and right doors or other areas known to have symmetry. In some embodiments, a car body detector 24B uses object detection, filtering methods, or segmentation detection from an input image to determine a particular car body or particular scratch area or damage area of the car body. The car body detector can include or separately include a scratch area detector 24C (with respect to the image). In some embodiments, the car body detector 24B can provide localization by using car pose estimation to localize a scratch area. In some embodiments, the scratch area can be mapped to a car surface location by unfolding a 3-D or three dimensional car model. In some embodiments, the system or method 20 can include a scratch feature extractor 24E that can be extracted after the scratch area detector. Most scratches can be composed of edges or texture. Note that texture is highly diverse as part of the extraction process and therefore it is very difficult to define and differentiate all forms of textures. In some embodiments, deep learning can learn to extract edge features from all the images. In some embodiments, the scratch feature extractor 24E can use a deep neural network (DNN) texture feature extractor where the dimensions of the features can be determined by cross-validation. In some embodiments, car body feature extractor 24D can further enhance or complement the texture extraction by extracting additional features such as car body color. In some embodiments, a car body color extractor can use a hue, saturation, and value (HSV) histogram to extract a color feature for a particular scratch and where the dimension of the feature can be determined by cross-validation. In some embodiments, the system 20 can include a feature extractor that determines a distance metric for the scratches used in calculating similarity. In some embodiments, the results of the scratch localizer 24A, car body feature extractor 24D and/or scratch feature extractor 24E can be used as inputs to a similarity calculator 24F to provide a metric for retrieving similar images at block 25. In some embodiments, the similarity calculator 24F can calculate a similarity matrix based on a learned distance metric or other metrics which enables the system to retrieve a top-N or top-number of images based on the similarity matrix. Human confirmation at block 27 can be used to compare or review consistency scores from block 23 with corresponding images retrieved at block 25.

In some embodiments, a system includes at least one memory and at least one processor of a computer system communicatively coupled to the at least one memory. The at least one processor can be configured to perform a method including methods described above.

According yet to another embodiment of the present disclosure, a computer readable storage medium comprises computer instructions which, responsive to being executed by one or more processors, cause the one or more processors to perform operations as described in the methods or systems above or elsewhere herein.

As shown in FIG. 3A, an information processing system 100 of a system 300 can be communicatively coupled with the consistency analysis module 302 and a group of client or other devices, or coupled to a presentation device for display at any location at a terminal or server location. According to this example, at least one processor 102, responsive to executing instructions 107, performs operations to communicate with the consistency analysis module 302 via a bus architecture 208, as shown. The at least one processor 102 is communicatively coupled with main memory 104, persistent memory 106, and a computer readable medium 120. The processor 102 is communicatively coupled with an Analysis & Data Storage 115 that, according to various implementations, can maintain stored information used by, for example, the consistency analysis module 302 and more generally used by the information processing system 100. Optionally, for example, this stored information can include information received from the client or other devices. For example, this stored information can be received periodically from the client devices and updated or processed over time in the Analysis & Data Storage 115. Additionally, according to another example, a history log can be maintained or stored in the Analysis & Data Storage 115 of the information processed over time. The consistency analysis module 302, and the information processing system 100, can use the information from the history log such as in the analysis process and in making decisions related determining similarity and to retrieving similar images.

The computer readable medium 120, according to the present example, can be communicatively coupled with a reader/writer device (not shown) that is communicatively coupled via the bus architecture 208 with the at least one processor 102. The instructions 107, which can include instructions, configuration parameters, and data, may be stored in the computer readable medium 120, the main memory 104, the persistent memory 106, and in the processor's internal memory such as cache memory and registers, as shown.

The information processing system 100 includes a user interface 110 that comprises a user output interface 112 and user input interface 114. Examples of elements of the user output interface 112 can include a display, a speaker, one or more indicator lights, one or more transducers that generate audible indicators, and a haptic signal generator. Examples of elements of the user input interface 114 can include a keyboard, a keypad, a mouse, a track pad, a touch pad, a microphone that receives audio signals, a camera, a video camera, or a scanner that scans images. The received audio signals or scanned images, for example, can be converted to electronic digital representation and stored in memory, and optionally can be used with corresponding voice or image recognition software executed by the processor 102 to receive user input data and commands, or to receive test data for example.

A network interface device 116 is communicatively coupled with the at least one processor 102 and provides a communication interface for the information processing system 100 to communicate via one or more networks 108. The networks 108 can include wired and wireless networks, and can be any of local area networks, wide area networks, or a combination of such networks. For example, wide area networks including the internet and the web can intercommunicate the information processing system 100 with other one or more information processing systems that may be locally, or remotely, located relative to the information processing system 100. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 116 can provide a communication interface for the information processing system 100 to access the at least one database 117 according to various embodiments of the disclosure.

The instructions 107, according to the present example, can include instructions for monitoring, instructions for analyzing, instructions for retrieving and sending information and related configuration parameters and data. It should be noted that any portion of the instructions 107 can be stored in a centralized information processing system or can be stored in a distributed information processing system, i.e., with portions of the system distributed and communicatively coupled together over one or more communication links or networks.

Figure 3B:
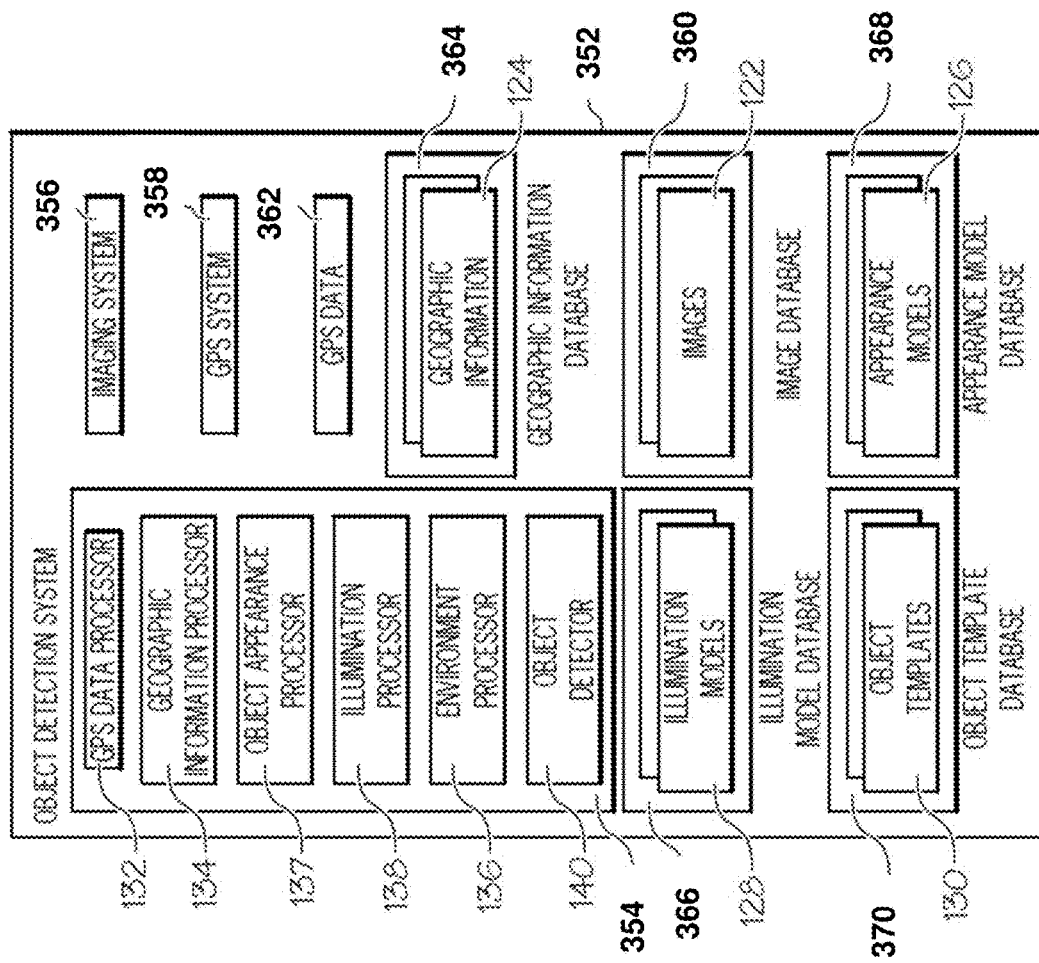
FIG. 3B is another block diagram of an alternative information processing system according to various embodiments of the disclosure.

According to one embodiment, FIG. 3B illustrates a general overview of one operating environment 350 for detecting objects in one or more frames/images. In particular, FIG. 3B shows an information processing system 352 that can be implemented for use with or implemented within a vehicle such as an automobile, motorcycle, watercraft, and the like. The system 352 includes, among other things, an object detection system (ODS) 354, one or more imaging systems 356, and one or more global positioning systems (GPS) 358. The system 352 also comprises an image database 360, GPS data 362, a geographic information database 364, an illumination model database 366, an appearance model database 368, and an object template database (DB) 370.

The image database 360 comprises one or more frames/images 122. The frames/images 122, in one embodiment, represent frames of a still photo sequence (or video sequence) of an external environment captured by one or more imaging devices (e.g., cameras) of the imaging system 356. Two or more of these imaging devices can have overlapping field of views. The geographic information database 364 comprises geographic information 124 such as, but not limited to, maps and mapping information, points-of-interests and associated information (e.g., addresses, phone numbers, etc.), and any other information that can be utilized in a mapping or navigational environment that can assist in determining consistency as noted above.

The appearance model database 368 comprises appearance models 126 for various environmental factors such as, but not limited to, weather conditions (e.g., sunny, cloudy, overcast, raining, snowing, snow cover, etc.), seasons (e.g., winter, spring, summer, fall), time of day (e.g., morning, afternoon, dusk, night), and the like. These appearance models 126 model how a given object appears as a result of the above environmental factors. For example, an object can appear or be perceived differently between day time and night time. Objects can appear or be perceived differently based on the angle of view as well. The appearance models 126 allow the ODS 354 to account/compensate for this variability in appearance/perception and in the consistency analysis.

The illumination model database 366 comprises illumination models 128 such as illumination specific models, illumination invariant models, and synthesized illumination models that are utilized by the ODS 354 to compensate for current illumination conditions (e.g., lighting and reflection conditions) of the external environment for the consistency analysis. Each of these illumination model types are discussed in greater detail below. The object template database 370 comprises a plurality of object templates 130 that are utilized by the ODS 354 when detecting a target object within the frames/images 122. In one embodiment, the object template database 370 comprises object templates for each type of object that is detectable by the ODS 354, such as (but not limited to) street signs, traffic signs, stop lights, road markings, addresses, business/building signs, billboards, buildings, businesses, headlights, road hazards, cars, pedestrians, animals, etc. The templates can also include templates for certain types of scratches or types of damage as might be contemplated from other data fed into the system.

An object template 130 can be one or more actual images associated with a detectable object. For example, if one type of object detectable by the ODS 354 is a gas station sign, an object template 130 can be an actual image of a gas station sign for a given gas station of interest. A given gas station can be associated with multiple different gas station signs. Therefore, images of each of these different signs can be included in the object template database 370 as a single object template or as separate object templates. Also, images of the detectable object at various angles, lighting conditions, and environmental conditions can also be stored as a template(s). This allows for a more robust detection process to be performed by the ODS 354. However, in another embodiment, a minimal number of images are used as object templates for each detectable object/object type. In this embodiment, the appearance models 126 and/or illumination models 128 can be applied to the object templates to account/compensate for various angles, lighting conditions, and environmental conditions under which an object may be captured by the imaging system 356. This allows the ODS 354 to maintain/retrieve fewer object templates 130 (and associated images), thereby saving storage space and processing resources while still providing a robust and accurate object detection process. In addition to (or in replacement of) images of a detectable object, an object template 130 can comprise information that has been extrapolated from an image of a given object of interest. This allows the information representing an image to be stored as compared to the image itself, thereby saving storage space.

It should be noted that each of the above databases and their components are discussed in greater detail below. It should also be noted that one or more of the geographic information database 364, the appearance model database 368, the illumination model database 366, and the object template database 370 can reside on a remote system (not shown) that is communicatively coupled to the system 352 via one or more networks (not shown). The data from one or more of these databases can be transmitted to the system 352 as needed, thereby reducing the storage space required by the system 352.

The ODS 354, in one embodiment, comprises a GPS data processor 132, a geographical information processor 134, an environment processor 136, an object appearance processor 137, an illumination processor 138, and an object detector 140. It should be noted that one or more of these components can reside outside of the ODS 354. It should also be noted that the functions of one or more of these components can be combined into a single component as well. The GPS data processor 132 processes/analyzes the GPS data 362 provided by the GPS system 358. For example, the GPS data processor 132 can analyze the GPS data 362 to determine information such as (but not limited to), the current time, vehicle velocity, vehicle direction, location of the vehicle, vehicle elevation, etc. The geographical information processor 134 utilizes the GPS data 362 to identify geographic information 124 associated with the vehicle's then current position/location and surrounding area. For example, based on location information within the GPS data 362 the geographical information processor 134 identifies a map within the geographic information database 364 that corresponds to the location information of the GPS data 362.

The environment processor 136 determines a current context of the environment in which the vehicle is travelling. For example, the environment processor 136 can determine the type of geographic area that the vehicle is located within such as a rural area or an urban area. The environment processor 136 can further determine a more granular context such as whether the current area is a wooded area, a mountainous area, a desert area, an industrial area, a downtown of a city, a suburb, etc. The ODS 354 uses this environmental/geographical context information to determine the probability that a target object is within the current area of the vehicle and could be used as part of the consistency check in certain scenarios.

The environment processor 136 can also determine environmental factor/condition information such as current weather conditions (e.g., sunny, cloudy, overcast, raining, snowing, snow cover, foggy, etc.), seasons (e.g., winter, spring, summer fall), time of day (e.g., morning, afternoon, dusk, night). In one embodiment, time-of-day information can also include average lighting/illumination information associated with a given area for a given time of day such as morning, afternoon, dusk, and night. The environment processor 136 can determine these factors/conditions by analyzing the frames/images 122 being captured by the imaging system 356. Environmental factors/conditions can also be determined from weather information transmitted with the GPS data 362. The environment processor 136 can also retrieve/receive environmental factor/condition information from one or more remote systems. In another embodiment, a user can enter the environmental factor/condition information into the ODS 354. These types of environmental factors/conditions can be used by the ODS 354 to identify appropriate appearance models 126 and/or illumination models 128 for an object template 130 and/or the frames/images 122 captured by the imaging system 356 to optimize the object detection system 354 with respect to the current environmental factors/conditions.

In yet another embodiment, substantially static environmental information such as season information (e.g., a calendar of seasons) and time of day information (e.g., time of sunrise, time of sunset, etc.) can be preloaded into the geographic information database 364 (or another database). Dynamic environmental information such as weather information, the current time, vehicle direct/velocity/elevation can be provided to the geographic information database 364 by one or more of the components in the system 352 such as the GPS data processor 132, and/or by one or more remote systems that are communicatively coupled to the system 352 via one or more networks (wired and/or wireless). This dynamic information can be received/retrieved by the system 352 at given intervals and/or on demand (e.g., when the environment processor 136, appearance processor 137, and/or illumination processor 138 requires the environment factor/condition for a given vehicle location).

The appearance processor 137 first identifies the right appearance models 126 based on the environment context information determined by the environment processor 136, and then applies such models to the right object templates 130, so as to generate appearance-adapted object templates. Such appearance-adapted object templates are later used to identify the objects-of-interest when processing the frames/images 122 captured by the imaging system 356. For example, the appearance processor 137 selects an appearance model 126 based on the time-of-day, season, weather conditions, etc., that has been detected by the environment processor 136 and automatically generates an adapted object template based on existing object template 130. This new object template is then used when processing a frame/image 122. In this instance, the objects of interest can be certain car makes, models and body options as well as comparisons with appropriate environmental factors (time of day, shadows, etc.) that match or adapt to the conditions that would be used for a comparison and can be used in refining the consistency analysis.

The illumination processor 138 first generates an illumination-adapted object template given an object template 130 (or an appearance-adapted object template if the appearance processor 137 is activated) by applying one of the following three illumination models: illumination specific model, illumination invariant model, and synthesized illumination model. The purpose of performing illumination adaptation, in one embodiment, is to match or normalize the object's current illumination condition with or against that of the object template 130. This illumination-adapted object template is later used to detect objects-of-interest when processing the frames/images 122 captured by the imaging system 356. This allows the ODS 354 to take into consideration various illumination conditions when performing the object detection process.

The ODS 354 further comprises one or more object detectors 140. The object detector 140 receives input from one or more of the various components of the system 352 discussed above. The object detector 140 utilizes the information received from these components to analyze the frames/images 122 for determining whether or not the frames/images 122 comprise a target object. In one embodiment, the object detector(s) 140 is a feature-based detector(s) and/or a machine-learning-based detector(s). However, other object detectors can be used as well.

Detection/Recognition within Digital Frames/Images

The ODS 354, in one embodiment, can operate in real time or non-real time scenarios to automatically detect various objects of a given desired object type/class from frames/images 122 captured by the imaging system(s) 356 utilizing GPS and geographical information (such as scratches on a particular car body model). It should be noted that the various examples of target objects given throughout the following discussion are non-limiting. In other words, the ODS 354 is able to detect any type of object. For example, the ODS 354 can detect buildings, landmarks (and other structures), vehicles, headlights, pedestrians, animals, and/or the like. Furthermore, within the context of a fraud detection system for vehicles, the objects can certainly include car makes, car models, car body parts, and various forms of car damage including scratches, dents, rust, and other deformities or irregularities from existing know car body portions or parts.

In one embodiment, the ODS 354 performs a multi-stage (multi-mode) process. For example, in one stage the ODS 354 identifies the current environmental context of an immediate area, surrounding area, and/or future area corresponding to a vehicle's current location to determine whether or not a target object is likely to be detected within a given amount of time or distance. If a target object is likely to be detected the ODS 354 activates object detection components of the system 352. If a target object is not likely to be detected, the object detection components of the system 352 can be deactivated. This saves power and processing resources. This assumes a detection system that is on-board a vehicle that can be used as part of the verification and consistency process.

The following is a more detailed discussion with respect to the multi-stage (multi-mode) process of the ODS 354. Operationally, the ODS 354 operates to determine whether or not the object detector 140 and its associated components should be activated or deactivated in a live or real time system. As discussed above, the GPS system 358 receives GPS data 362. The GPS data processor 132 analyzes this GPS data 362, to determine, for example, latitude and longitude coordinates of the vehicle and optionally, direction of travel, vehicle velocity, elevation, etc., which might be used for the consistency check. In many instances, the real time data is not necessary and only historical data can be used for the consistency checks contemplated. This information is then passed to the geographical information processor 134. The geographical information processor 134 uses this information to identify geographic information 124 such as a map associated with the location of the vehicle at the time of the image capture, which is determined by the GPS data processor 132. The map can be a street map, a topographical map, a satellite map, a combination thereof, or the like. The information processor 134 can switch between each of these map types as needed.

The environment processor 136 analyzes a corresponding map to determine an environmental context of the current area, future area, and/or surrounding area of the vehicle. For example, the environment processor 136 can determine if the vehicle is currently located within or will be travelling into a rural area, an urban area, etc. The environment processor 136 can further determine a more granular context such as whether the area is a wooded area, a mountainous area, an industrial area, a downtown of a city, a suburb, etc. In one embodiment, the environment processor 136 is able to determine this context based on detected features within the map such as forests, buildings, houses, etc. In another embodiment, a map is associated with metadata describing the various areas within the map. Based on this metadata the environment processor 136 can determine an environmental context associated therewith.

The environment processor 136 can further analyze the map to identify potential target objects or objects associated with target objects that might be associated with a claim. For example, if the target object is a traffic sign, such as stop sign or a stop light, the environment processor 136 can analyze the map to determine if the current area or an upcoming area comprises any such target objects. The environment processor 136 can also determine if the map comprises items/features associated with a target object. For example, the environment processor 136 can analyze the map to determine if the map comprises an intersection, which is generally associated with a stop sign or stop light. The environment processor 136 is able to zoom into the map for a more granular/detailed view when trying to identify potential target objects. The environment processor 136 can also zoom-out to analyze a larger area.

Based on this determined environmental context the environment processor 136 can determine if a target object is likely to be found and either activate or deactivate the object detector 140 and associated components such as the imaging system 356. For example, if a target object is a specific coffee shop and the environment processor 136 has determined that the vehicle is currently traveling in rural area or that the area in the map failed to comprise any buildings, the environment processor 136 determines that the probability of a target object being in this area is below (or equal to) a given threshold and deactivates (or keeps deactivated) the object detector 140. However, if the current target object is a pedestrian and the environment processor 136 determines that the vehicle is entering a populated area then the environment processor 136 determines that the probability of a target object being in this area is above (or equal to) a given threshold and activates (or keep activated) the object detector 140. In some embodiments, the activation can be triggered by events that can possibly result in damage to the car such as events like sudden breaking or sudden deceleration.

Also, the environment processor 136 can use the current scale of the map and the vehicle's current speed to estimate a given time frame until the vehicle reaches an area that is likely to comprise a target object. In this embodiment, the environment processor 136 can set a timer (or adjust an existing timer based on vehicle speed) for automatically activating the object detector 140 and its associated components. The same can be performed with respect to estimating when the vehicle will reach an area where target objects are not likely to be detected. A timer can then be set (or updated) for automatically deactivating the object detector 140 and its associated components such as the imaging system 356, object appearance processor 137 and the illumination processor 138. It should be noted that the above operating mode of determining whether to activate/deactivate the object detector 140 and its associated components is optional. In other words, the object detector 140 and its associated components can always be active or active only when manually activated by a user or activated by predetermined events that might be associated with potential damage to the vehicle.

If the ODS 354 determines that the object detector 140 and its associated components should be activated (or remain activated), the ODS 354 then operates in a second operating mode for detecting target objects. It should be noted that in this mode the environmental context determined by the environment processor 136 can be passed to the object detector 140 or another component of the ODS 354. Alternatively, the environmental context information can be stored during the first operating modes and later retrieved by the ODS 354 while operating in the second mode.

When the object detector 140 is in an activated state, the environment processor 136 can identify environment factor/condition information such as weather conditions (e.g., sunny, cloudy, overcast, raining, snowing, snow cover, etc.), seasons (e.g., winter, spring, summer fall), time of day (e.g., morning, afternoon, dusk, night), and the like. It should be noted that this environment factor/condition can also be identified as part of the first operating mode discussed above as well. The object appearance processor 137 analyzes the environment factor/condition information gathered by the environment processor 136. Based on this analysis the object appearance processor 137 selects an appearance model 126, applies it to the target objects in the object template database (DB) 370, and generates appearance-adapted object templates. Such adapted object templates are used to detect objects-of-interest in the frames/images 122 captured by the imaging system 356. Alternatively, the appearance model 126 can be passed to the object detector 140 for performing an appearance normalization process on the frames/images 122 captured by the imaging system 356, so that the objects' appearances in the normalized frames/images match those of the objects in the object template DB 370. As discussed above, an object can appear (or be perceived) differently within the frames/images 122 based upon the angle at which the object is viewed, the weather conditions, the current season, the time of day, illumination conditions, etc. Therefore, the appearance model 126 is used by the ODS 354 to normalize a captured frame/image 122 based on the current environment factors/conditions. This increases the accuracy of the object detector 140 and provides for better consistency values as a result of the appearance normalization process.

In addition, the illumination processor 138 determines an illumination context associated with the area and/or surrounding area in which the vehicle is currently located at the time of the image capture and optionally a future area in which the vehicle may travel. It should be noted that the illumination context can be determined during the first mode/stage of operation discussed above. Also, the illumination context can be determined by either of the environment processor 136 and/or the illumination processor 138. If the illumination processor 138 determines/obtains this information, the illumination processor 138 can perform the same process as described above with respect to the environment processor 136.

In one embodiment, the illumination context is determined based on illumination conditions such as lighting and reflectance conditions determined by the environment processor. These lighting and reflectance conditions can vary based on vehicle direction/velocity/elevation, weather conditions, season information, time of day information, and the like. This results in the illumination/reflective characteristics of an object within a frame/image can vary depending on environmental factors. For example, a traffic sign may appear different in an image depending on whether there is snow on the ground reflecting sun light onto the sign or whether there is cloud cover. Similarly, a scratch may appear differently depending on snow and light conditions.

The illumination context used by the illumination processor 138 can select one or more illumination models 128 for optimizing the object detector 140 with respect to the current illumination conditions that have been detected at the time of image capture.

The illumination processor 138 selects one or more illumination models 128 based on the determined illumination context. The frames/images 122 and/or the object templates 130 are then processed based on the selected illumination model(s) 128. Alternatively, the selected illumination model(s) 128 can be passed to the object detector 140 to optimize the detection process with respect to the illumination context that has been determined.

One type of illumination model that can be selected is an illumination specific model. An illumination specific model is a model that has been trained for a target object with respect to a specific illumination condition such as, dawn, daytime, dusk, night time, etc. For example, a target object such as a stop sign can be associated with an illumination specific models that have been trained with respect to the stop sign in early morning lighting conditions, daytime lighting conditions, twilight lighting conditions, and night time lighting conditions. Therefore, if the current illumination context indicates that the current lighting conditions correspond to twilight lighting conditions the illumination processor 138 can select a twilight illumination model. This illumination model can then be used by the ODS 354 to adjust/optimize the object detector 140 for twilight lighting conditions and could be extended to optimization and adjustment of images used for comparison with respect to scratches or other vehicle damage. Therefore, not only is the object detector 140 optimized for specific lighting conditions, the object detector is optimized for detecting a given target object in those specific lighting conditions.

Another type of illumination model is an illumination invariant model. This model type allows for the object detector 140 to be adjusted/optimized for various illumination conditions without having to maintain multiple illumination specific models for each detectable object. In this embodiment, the illumination processor 138 utilizes an illumination invariant model to normalize frames/images 122 captured by two or more imaging devices with overlapping field of views. This normalization process allows the object detector 140 to perform an accurate detection process across varying illumination conditions. One advantage of the illumination invariant model is that multiple illumination specific models for an object of interest do not need to be generated and maintained, thereby saving processing and storage resources.

An illumination invariant model utilizes epipolar geometry to solve corresponding features/shapes within the images. With this model brightness of the corresponding points in the multiple camera views are related to provide constraints for assessing the illumination conditions and albedo of a target object. The illumination processor 138 also performs albedo and illumination assessment for applying illumination correction to the images to obtain illumination normalized images. By taking the albedo into account, the illumination processor 138 can improve object detection performance by confirming the existence of a target object within multiple camera views. When the illumination is normalized, the illumination processor 138 can apply the illumination invariant model to frames/images under varying lighting conditions. It should be noted that if multiple cameras are not available in the imaging system 356, quotient-image based techniques can be used to obtain a normalized model of the target objects for more accurate matching.

The illumination processor 138 can also select/create a synthesized illumination model. A synthesized illumination model is created from at least one illumination specific model (e.g., a daytime illumination model) and an illumination invariant model. In other words, additional illumination specific models can be generated from a single illumination specific model and an illumination invariant model. This allows for illumination specific models to be generated at any granularity level without the cost of collecting training data for each such illumination condition.

It should be noted that the ODS 354 is not required to utilize both the appearance models 126 and the illumination models 128. For example, the ODS 354 can utilize only one of these model types 126, 128. Once frames/images 122 and/or the object templates 130 have been processed with respect to at least one appearance model 126 and/or at least one illumination model 128 (or once these models have been passed to the object detector 140), the object detector 140 analyzes the frames/images 122 to determine whether or not a target object exists within the frames/images 122. For example, in one embodiment, the object detector 140 compares the frames/images 122 to one or more corresponding processed object templates 130. If the features identified within the frames/images 122 substantially match the features of the processed object template(s) 130 the object detector 140 determines that a target object has been identified within the frames/images 122. The user can then be notified of the detected object or other actions can be performed. It should be noted that various object detection processes can be utilized by the object detector 140.

FIG. 4 illustrates an example of a method, according to various embodiments of the present disclosure, which can operate in conjunction with the information processing system of FIG. 3A or 3B. Specifically, according to the example shown in FIG. 4, a method 400 for detecting insurance fraud or for comparing references using visual analytics includes the initial step 402 of inputting data in the form of multiple images used for comparison. A consistency check can look for consistency in images for car model, scratch locations, and space and time consistency between images, besides comparisons with data in an insurance record database. The consistency check can look at various sets of data including vehicle model, scratch location, geographic location tags, and time tags. A more robust check can further include the step 404 of identifying a scratch and a scratch location on a vehicle, for example, in a 3-dimensional rendering in comparison to a base image or in comparison to a stored image in a database. A more robust method would further include steps to compare particular features of the scratch detected in the images. For example, at step 406, the method can compare one or more color features of the scratch in the scratch location in comparison to the scratch location in the base image or the stored image or at step 408 the method can compare one or more texture features of the scratch in the scratch location in comparison to the texture features in the scratch location in the base image or the stored image. At step 410, the method can generate a similarity calculation based on the one or more comparisons for the scratch, the scratch location, the one or more color features of the scratch, or the one or more texture features of the scratch. The similarity calculation can include an analysis of the comparison of the scratch location and a comparison of metadata associated with the base image or with the stored image in the database. Optionally, the method can present the result of the similarity calculation. The similarity calculation (and other consistency checks) can provide a value that can be compared to a predetermined threshold value at decision block 412. The threshold can be set based on a desired reliability or confidence level. If the value fails to exceed the threshold value, then the claims associated with the inputted images can be flagged for potential insurance fraud at block 416. If the value meets or exceeds the threshold value at decision block 412, then the method can retrieve the images and continue with the next steps in the insurance claim process at 414.

In some embodiments, the identifying at step 404 can include vehicle pose estimation, localization of the scratch location to a scratch area and a mapping to a vehicle surface location by unfolding a 3 dimensional vehicle model. In some embodiments, the comparing at step 408 can include extraction of texture features using at least one of deep learning techniques, deep neural networks, or extreme learning machines and the comparing of color features at step 406 can include use of a hue, saturation, and value histograms.

Non-Limiting Examples

The examples provide herein may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present disclosure can further incorporate interfaces that each includes separate, fully programmed microprocessors that are used to off-load processing from the processor. An operating system (not shown) included in main memory for the information processing system may be a suitable multitasking and/or multiprocessing operating system, such as, but not limited to, any of the Linux, UNIX, Windows, and Windows Server based operating systems. Various embodiments of the present disclosure are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A computer implemented method for detecting vehicle insurance claim fraud, comprising:
    storing one or more images captured with an imaging system from an environment, the one or more images corresponding to an insurance claim for a vehicle, at least one of the one or more images including at least a portion of the vehicle in the environment;
    maintaining one or more object templates associated with a detectable object corresponding to the vehicle, at least one of the one or more object templates including an image of a scratch at a scratch location on the vehicle;
    maintaining a set of illumination models including at least one illumination model selected from an illumination specific model, an illumination invariant model, or a synthesized illumination model;
    identifying a current illumination context of the environment in which the vehicle is located in at least one of the one or more images captured with the imaging system;
    selecting one or more illumination models from the set of illumination models, based on illumination conditions associated with the identified current illumination context;

applying illumination correction, based on the selected one or more illumination models, to one of:
  the at least one of the one or more images including at least a portion of the vehicle in the environment, or
  the at least one of the one or more object templates including an image of a scratch at a scratch location on the vehicle;
identifying a scratch and a scratch location on the vehicle in the at least one of the one or more images including at least a portion of the vehicle in the environment in comparison, performed by at least one processor of at least one computing device, to a base image of a scratch at a scratch location on the vehicle in the at least one of the one or more object templates;
comparing, by the at least one processor, one or more color features of the scratch in the scratch location in the at least one of the one or more images in comparison to the scratch in the scratch location in the base image in the at least one of the one or more object templates;
comparing, by the at least one processor, one or more texture features of the scratch in the scratch location in the at least one of the one or more images in comparison to the scratch in the scratch location in the base image in the at least one of the one or more object templates;
generating, by the at least one processor, a similarity calculation based on one or more comparisons for the scratch, the scratch location, the one or more color features of the scratch, and the one or more texture features of the scratch; and
presenting, via a user interface, a result indicating a potential of insurance fraud, in response to the similarity calculation.

2. The computer implemented method of claim 1, wherein the method further comprises confirming an insurance claim based on the similarity calculation having a score above a predetermined threshold.

3. The computer implemented method of claim 1, wherein the identifying comprises a vehicle pose estimation, localization of the scratch location to a scratch area and a mapping to a vehicle surface location by unfolding a 3-dimensional vehicle model.

4. The computer implemented method of claim 1, wherein the comparing of one or more texture features comprises an extraction of texture features using at least one of deep learning techniques, deep neural networks, or extreme learning machines.

5. The computer implemented method of claim 1, wherein the comparing of one or more color features comprises use of a hue, saturation, and value histogram.

6. The computer implemented method of claim 1, wherein the similarity calculation comprises an analysis of the comparison of the scratch location and a comparison of metadata associated with the base image or with a stored image in a database.

7. The computer implemented method of claim 1, further comprising comparing, by the at least one processor, a plurality of images for consistency for vehicle model, scratch location, geographic location tag, and time tag.

8. The computer implemented method of claim 7, further comprising comparing one or more of vehicle model, scratch location, geographic location tag, or time tag for consistency with an insurance record file.

9. The computer implemented method of claim 7, wherein the method further comprises detecting a car body from an input image using object detection or segmentation methods.

10. The computer implemented method of claim 1, wherein the method further comprises retrieving a predetermined number of images based on the similarity calculation.

11. A system comprising:
at least one memory; and
at least one processor of a computer system communicatively coupled to the at least one memory, the at least one processor, responsive to instructions stored in memory, being configured to perform a method for detecting vehicle insurance claim fraud, comprising:
storing one or more images captured with an imaging system from an environment, the one or more images corresponding to an insurance claim for a vehicle, at least one of the one or more images including at least a portion of the vehicle in the environment;
maintaining one or more object templates associated with a detectable object corresponding to the vehicle, at least one of the one or more object templates including an image of a scratch at a scratch location on the vehicle;
maintaining a set of illumination models including at least one illumination model selected from an illumination specific model, an illumination invariant model, or a synthesized illumination model;
identifying a current illumination context of the environment in which the vehicle is located in at least one of the one or more images captured with the imaging system;
selecting one or more illumination models from the set of illumination models, based on illumination conditions associated with the identified current illumination context;
applying illumination correction, based on the selected one or more illumination models, to one of:
  the at least one of the one or more images including at least a portion of the vehicle in the environment, or
  the at least one of the one or more object templates including an image of a scratch at a scratch location on the vehicle;
identifying a scratch and a scratch location on the vehicle in the at least one of the one or more images including at least a portion of the vehicle in the environment in comparison, performed by at least one processor of at least one computing device, to a base image of a scratch at a scratch location on the vehicle in the at least one of the one or more object templates;
comparing, by the at least one processor, one or more color features of the scratch in the scratch location in the at least one of the one or more images in comparison to the scratch in the scratch location in the base image in the at least one of the one or more object templates;
comparing, by the at least one processor, one or more texture features of the scratch in the scratch location in the at least one of the one or more images in comparison to the scratch in the scratch location in the base image in the at least one of the one or more object templates;
generating, by the at least one processor, a similarity calculation based on one or more comparisons for the scratch, the scratch location, the one or more color features of the scratch, and the one or more texture features of the scratch; and
presenting, via a user interface, a result indicating a potential of insurance fraud, in response to the similarity calculation.

12. The system of claim 11, further comprising instructions stored in memory which when executed by the at least one processor causes the at least one processor to perform the operation of confirming an insurance claim based on the similarity calculation having a score above a predetermined threshold.

13. The system of claim 11, wherein the instructions stored in memory which when executed by the at least one processor causes the at least one processor to perform the operation of identifying by providing an automobile pose estimation, a localization of the scratch location to a scratch area and a mapping to an automobile surface location by unfolding a 3-dimensional vehicle model.

14. The system of claim 11, wherein the instructions stored in memory which when executed by the at least one processor causes the at least one processor to perform the operation of comparing of one or more textures by the extraction of texture features using at least one of deep learning techniques, deep neural networks, or extreme learning machines and perform the operation of comparing of one or more color features by use of a hue, saturation, and value histogram.

15. The system of claim 11, further comprising comparing a plurality of images for consistency for vehicle model, scratch location, geographic location tag, and time tag.

16. The system of claim 15, further comprising comparing one or more of vehicle model, scratch location, geographic location tag, or time tag for consistency with an insurance record file.

17. A non-transitory computer-readable storage medium having stored therein instructions which, when executed by at least one processor of at least one computing device, cause a computer system to perform a method for detecting vehicle insurance claim fraud, the method comprising:
  storing one or more images captured with an imaging system from an environment, the one or more images corresponding to an insurance claim for a vehicle, at least one of the one or more images including at least a portion of the vehicle in the environment;
  maintaining one or more object templates associated with a detectable object corresponding to the vehicle, at least one of the one or more object templates including an image of a scratch at a scratch location on the vehicle;
  maintaining a set of illumination models including at least one illumination model selected from an illumination specific model, an illumination invariant model, or a synthesized illumination model;
  identifying a current illumination context of the environment in which the vehicle is located in at least one of the one or more images captured with the imaging system;
  selecting one or more illumination models from the set of illumination models, based on illumination conditions associated with the identified current illumination context;
  applying illumination correction, based on the selected one or more illumination models, to one of:
    the at least one of the one or more images including at least a portion of the vehicle in the environment, or
    the at least one of the one or more object templates including an image of a scratch at a scratch location on the vehicle;
  identifying a scratch and a scratch location on the vehicle in the at least one of the one or more images including at least a portion of the vehicle in the environment in comparison, performed by at least one processor of at least one computing device, to a base image of a scratch at a scratch location on the vehicle in the at least one of the one or more object templates;
  comparing, by the at least one processor, one or more color features of the scratch in the scratch location in the at least one of the one or more images in comparison to the scratch in the scratch location in the base image in the at least one of the one or more object templates;
  comparing, by the at least one processor, one or more texture features of the scratch in the scratch location in the at least one of the one or more images in comparison to the scratch in the scratch location in the base image in the at least one of the one or more object templates;
  generating, by the at least one processor, a similarity calculation based on one or more comparisons for the scratch, the scratch location, the one or more color features of the scratch, and the one or more texture features of the scratch; and
  presenting, via a user interface, a result indicating a potential of insurance fraud, in response to the similarity calculation.

18. The non-transitory computer-readable storage medium of claim 17, further comprising confirming, by the at least one processor, of an insurance claim based on the similarity calculation having a score above a predetermined threshold.

19. The non-transitory computer-readable storage medium of claim 17, wherein the identifying comprises an automobile pose estimation, localization of the scratch location to a scratch area and a mapping to an automobile surface location by unfolding a 3-dimensional vehicle model.

20. The non-transitory computer-readable storage medium of claim 17, wherein the comparing of one or more texture features comprises an extraction of texture features using at least one of deep learning techniques, deep neural networks, or extreme learning machines and wherein the comparing of one or more color features comprises use of a hue, saturation, and value histogram.

* * * * *